UNITED STATES PATENT OFFICE

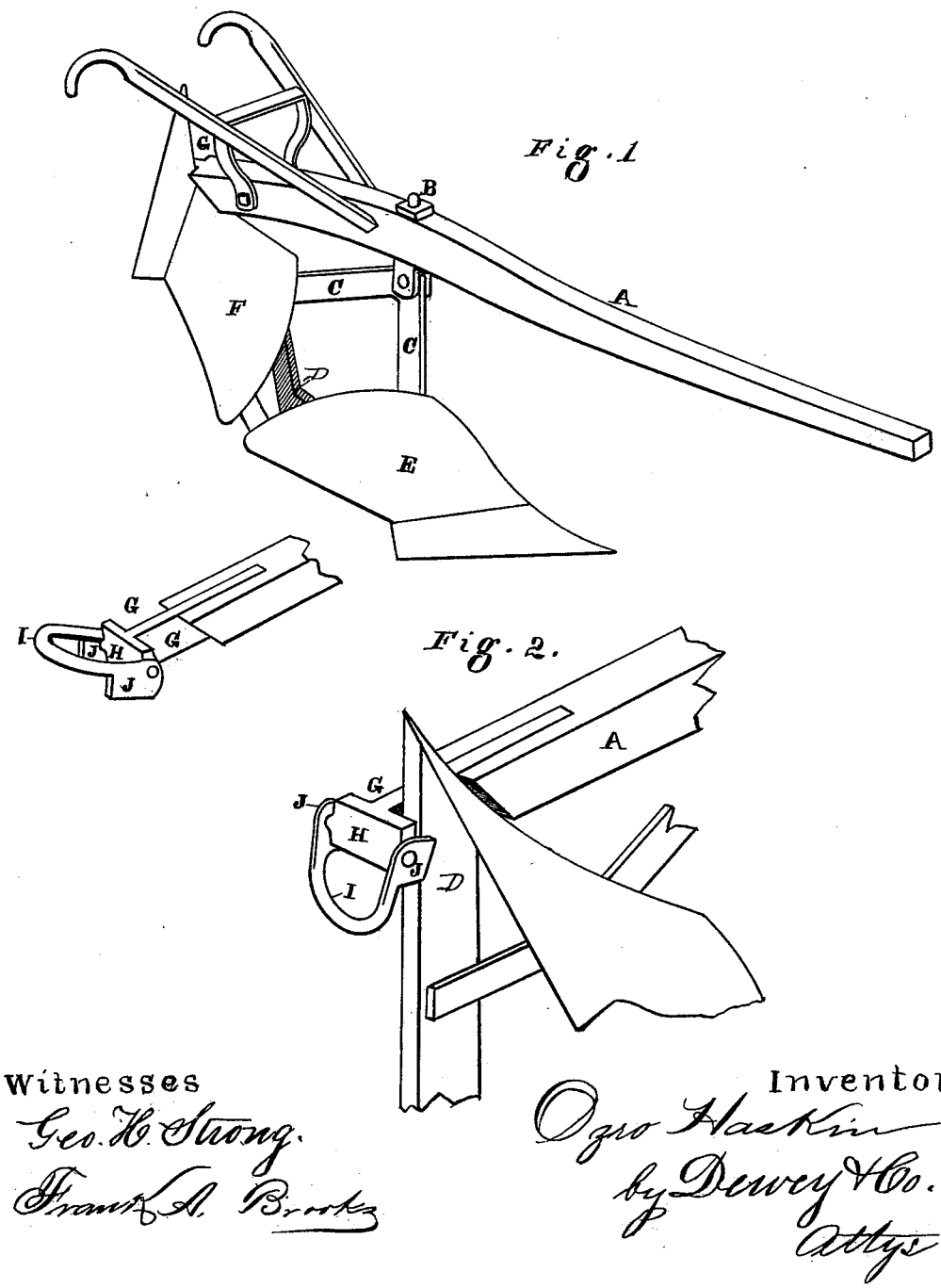

OZRO HASKIN, OF CAMBRIA, CALIFORNIA.

IMPROVEMENT IN REVERSIBLE PLOWS.

Specification forming part of Letters Patent No. 221,457, dated November 11, 1879; application filed September 2, 1878.

*To all whom it may concern:*

Be it known that I, OZRO HASKIN, of Cambria, county of San Luis Obispo, and State of California, have invented an Improvement in Reversible Plows; and I do hereby declare the following to be a full, clear, and exact description thereof, reference being had to the accompanying drawings.

My invention relates to certain improvements in reversible plows in which the landside and mold-board are alternately changed with reference to the beam, so as to turn the furrow in the same direction as the plow is drawn back and forth across the field, being especially applicable to hill-side plowing.

It consists in a right and left hand mold-board attached to the double reversible landside hinged to the vertical swiveling axis of the blow-beam, and also in a method of holding and locking the plow in position, as will be more fully described in the following specification, reference being had to the accompanying drawings, in which—

Figure 1 is a perspective view. Fig. 2 is an enlarged view of the rear end of the beam and locking device.

A is a plow-beam, having the ordinary handles and a vertical axis or pivot-pin, B. The lower end of the pivot-pin B forms a jaw, to which the standards C C are hinged by means of a pin or bolt passed through them at the point where they intersect, these standards forming one continuous bar bent at nearly a right angle, so that it supports the double land-side D, having right and left hand mold-boards E and F. These standards are alternately brought to a vertical position, which places the land-sides to which they are attached alternately in a horizontal position.

Usually these double plows are in the same, or nearly in the same, plane, so that when one is turning the furrow the other is dragging behind, or but slightly elevated above the surface; but in my plow the land-side not at work stands at nearly right angles with the other, and is raised and held in a recess, G, in the rear end of the beam A. This recess is formed by a metal T-head, H, which is secured into the beam and projects out behind it, as shown. Pivoted to each side of the arms of the T-head is a loop or link, I, of iron, having lugs J upon each side, so that this link may be raised by the hand to release one of the plows; and when the beam has turned around the pivot-pin B the other plow-point may be brought up into the other recess and the link dropped, so that one of the lugs J will lock and secure it while the opposite plow is at work. The device is easily operated, and needs no complicated mechanism to lock and hold it.

In the ordinary construction of this class of plows the standards C C are usually secured to the pivot-pin B in a rigid manner. This does not permit the rear plow to be raised out of the furrow, as described in my invention. Where the plow is so mounted as to turn or swivel about a vertical axis, this axis has been continued down to the heel of the plow.

In my construction I have hinged the angular double standard closely beneath the beam, and, by the use of my T-shaped recessed locking-head, the point of the plow not in use is firmly locked in the recess, so that all the strain is brought upon this T-head, thus relieving the pivot, which would otherwise soon get out of order and prevent the plows from locking.

It will be seen that my T-head locking device has two recesses, each of which is fitted to receive one of the plow-points, and each of the lugs J locks one of the points. By this construction each land-side lies flat against the body of the head-piece and fits its recess perfectly, so that there is no rattle or jar.

My plow may be used as an ordinary single or right or left hand plow.

Having thus described my invention, I do not claim, broadly, a double plow having a swinging beam and handles upon a central pivot; but

What I do claim, and desire to secure by Letters Patent, is—

1. The vertical pivot-pin B, passing through and turning in the beam, and having the lug or jaw formed close to the beam, in combination with the double mold-boards and land-sides and the continuous angular bar C, which forms the double standard, said bar having its angle hinged or pivoted to the lug of the pivot-pin, substantially as herein described.

2. The locking device consisting of the double recess formed by the T-head H and the pivoted swinging link I, with its lugs J, in combination with the double plows having the continuous angular standard-bar C hinged and swiveled beneath the beam, as shown, whereby each plow may be brought to the rear and turned up so that its point will fit its corresponding recess and be locked or released by one of the lugs J, substantially as herein described.

In witness whereof I have hereunto set my hand and seal.

OZRO HASKIN. [L. S.]

Witnesses:
 RUFUS RIGDON,
 PHILIP KAETZEL.